US008236122B2

(12) United States Patent
Kronzer

(10) Patent No.: US 8,236,122 B2
(45) Date of Patent: Aug. 7, 2012

(54) HEAT TRANSFER METHODS AND SHEETS FOR APPLYING AN IMAGE TO A COLORED SUBSTRATE

(75) Inventor: Frank J. Kronzer, Woodstock, GA (US)

(73) Assignee: Neenah Paper, Inc., Alpharetta, GA (US)

(*) Notice: Subject to any disclaimer, the term of this patent is extended or adjusted under 35 U.S.C. 154(b) by 881 days.

(21) Appl. No.: 12/250,975

(22) Filed: Oct. 14, 2008

(65) Prior Publication Data

US 2010/0089525 A1 Apr. 15, 2010

(51) Int. Cl.

| | |
|---|---|
| ***B44C 3/02*** | (2006.01) |
| ***B44C 1/165*** | (2006.01) |
| ***B29C 65/02*** | (2006.01) |
| ***B32B 37/06*** | (2006.01) |
| ***B32B 37/14*** | (2006.01) |
| ***B32B 37/15*** | (2006.01) |
| ***B32B 38/10*** | (2006.01) |
| ***B32B 38/14*** | (2006.01) |
| *B44C 1/18* | (2006.01) |
| *B29C 65/40* | (2006.01) |
| *B32B 37/10* | (2006.01) |
| *B32B 37/26* | (2006.01) |

(52) U.S. Cl. ........ 156/235; 156/234; 156/240; 156/247; 156/249

(58) Field of Classification Search .................. 156/234, 156/235, 240, 247, 249
See application file for complete search history.

(56) References Cited

U.S. PATENT DOCUMENTS

| | | | | |
|---|---|---|---|---|
| 3,444,732 | A * | 5/1969 | McKinley et al. | .......... 73/150 A |
| 3,922,445 | A | 11/1975 | Mizuno et al. | |
| 4,097,279 | A * | 6/1978 | Whitehead | ...................... 430/39 |
| 4,383,878 | A * | 5/1983 | Young et al. | .................. 156/235 |
| 4,785,313 | A | 11/1988 | Higuma et al. | |
| 5,501,902 | A | 3/1996 | Kronzer | |
| 5,798,179 | A | 8/1998 | Kronzer | |
| 6,277,229 | B1 | 8/2001 | Popat et al. | |
| 6,506,445 | B2 | 1/2003 | Popat et al. | |
| 6,521,308 | B1 * | 2/2003 | Bourdelais et al. | .......... 428/40.1 |
| 6,849,370 | B2 | 2/2005 | Wagner et al. | |

(Continued)

FOREIGN PATENT DOCUMENTS

EP 1136274 A2 9/2001

(Continued)

OTHER PUBLICATIONS

ASTM Designation: D 1238-95, "Standard Test Method for Flow Rates of Thermoplastics by Extrusion Plastometer", Nov. 10, 1995, pp. 273-281.

(Continued)

*Primary Examiner* — Sonya Mazumdar
(74) *Attorney, Agent, or Firm* — Dority & Manning, P.A.

(57) ABSTRACT

A method of forming an opaque image on a substrate is generally provided. The method generally includes the use of three papers: a toner printable sheet, a coating transfer sheet, and an opaque transfer sheet. Toner printing can be utilized to print an image on the toner printable sheet, and then the toner ink can be utilized to remove a portion of a melt coating layer from the coating transfer sheet to form an intermediate imaged coated transfer sheet. This intermediate imaged coated transfer sheet and the opaque transfer sheet can then be utilized to form an image, defined by the opaque areas, on a substrate.

13 Claims, 6 Drawing Sheets

U.S. PATENT DOCUMENTS

| | | | |
|---|---|---|---|
| 6,871,950 B2 | 3/2005 | Higuma et al. | |
| 7,238,410 B2 | 7/2007 | Kronzer | |
| 7,361,247 B2 | 4/2008 | Kronzer | |
| 7,364,636 B2 | 4/2008 | Kronzer | |
| 7,470,343 B2 | 12/2008 | Kronzer | |
| 7,604,856 B2 | 10/2009 | Kronzer et al. | |
| 2002/0108703 A1* | 8/2002 | Romano et al. | 156/240 |
| 2005/0142307 A1 | 6/2005 | Kronzer | |
| 2006/0019043 A1 | 1/2006 | Kronzer | |
| 2009/0110850 A1 | 4/2009 | Kronzer | |
| 2009/0111039 A1 | 4/2009 | Kronzer | |
| 2009/0136866 A1 | 5/2009 | Kronzer | |

FOREIGN PATENT DOCUMENTS

| | | |
|---|---|---|
| EP | 1136274 A3 | 9/2001 |
| WO | WO 03066337 A2 | 8/2003 |
| WO | WO 03066337 A3 | 8/2003 |

OTHER PUBLICATIONS

ASTM Designation: E 28-99 (Reapproved 2004), "Standard Test Methods for Softening Point of Resins Derived from Naval Stores by Ring-and-Ball Apparatus", Jun. 2004, pp. 1-6.

Search Report and Written Opinion for PCT/US2009/059195 dated Nov. 24, 2009, 9 pages.

* cited by examiner

HEAT TRANSFER METHODS AND SHEETS FOR APPLYING AN IMAGE TO A COLORED SUBSTRATE

BACKGROUND OF THE INVENTION

In recent years, a significant industry has developed which involves the application of customer-selected designs, messages, illustrations, and the like (referred to collectively hereinafter as "images") on articles, such as T shirts, sweat shirts, leather goods, and the like. These images may be commercially available products tailored for a specific end-use and printed on a release or transfer paper, or the customer may generate the images on a heat transfer paper. The images are transferred to the article by means of heat and pressure, after which the release or transfer paper is removed.

Much effort has been directed at generally improving the transferability of an image-bearing laminate (coating) to a substrate. For example, an improved cold-peelable heat transfer material has been described in U.S. Pat. No. 5,798,179, which allows removal of the base sheet immediately after transfer of the image-bearing laminate ("hot peelable heat transfer material") or some time thereafter when the laminate has cooled ("cold peelable heat transfer material"). Moreover, additional effort has been directed to improving the crack resistance and washability of the transferred laminate. The transferred laminate must be able to withstand multiple wash cycles and normal "wear and tear" without cracking or fading.

Heat transfer papers generally are sold in standard printer paper sizes, for example, 8.5 inches by 11 inches. Graphic images are produced on the transferable surface or coating of the heat transfer paper by any of a variety of means, for example, by ink-jet printer, laser-color copier, other toner-based printers and copiers, and so forth. The image and the transferable surface are then transferred to a substrate such as, for example, a cotton T-shirt. In most instances, transfer of the transfer coating to areas of the articles which have no image is necessary due to the nature of the papers and processes employed, but it is not helpful or desirable. This is because the transfer coatings can stiffen the substrates, make them less porous and make them less able to absorb moisture.

Thus, it is desirable that the transferable surface only transfer in those areas where there is an image, reducing the overall area of the substrate that is coated with the transferable coating. Some papers have been developed that are "weedable", that is, portions of the transferable coating can be removed from the heat transfer paper prior to the transfer to the substrate. Weeding involves cutting around the printed areas and removing the coating from the extraneous non-printed areas. However, such weeding processes can be difficult to perform, especially around intricate graphic designs. When forming an image from opaque materials on a dark substrate, many techniques require weeding the transfer papers.

Therefore, there remains a need in the art for improved heat transfer papers and methods of application. Desirably, the papers and methods provide good image appearance and durability.

SUMMARY OF THE INVENTION

A method of forming an opaque image on a substrate is generally provided. Toner ink is printed onto a toner printable sheet to form imaged areas and unimaged areas. The printed toner printable sheet can then be used to form a first temporary laminate by combining the toner printable sheet with a coating transfer sheet that has a meltable coating layer. The first temporary laminate can be separated to form a coated toner printed sheet and an intermediate imaged coated transfer sheet such that the meltable coating layer of the coated transfer sheet has transferred to the imaged areas defined by the toner ink on the toner printable sheet to form the coated toner printed sheet and the meltable coating layer remaining on the intermediate image coated transfer sheet corresponds to the unimaged areas of the toner printable sheet. This intermediate image coated transfer sheet can then be utilized to form an opaque image on a substrate.

For example, a second temporary laminate can be formed by combining the intermediate imaged coated transfer sheet with an opaque transfer sheet having an opaque coating layer. This second temporary laminate can then be separated to form an intermediate melt-coated opaque transfer sheet such that the meltable coating layer remaining on the intermediate imaged coated transfer sheet has transferred to the opaque transfer sheet and the meltable coating layer overlies the opaque coating layer. The opaque coating layer and the meltable coating layer of the intermediate melt-coated opaque transfer sheet can then be transferred to the substrate such that the opaque coating layer overlies the meltable coating layer and the meltable coating layer overlies the substrate.

Alternatively, the meltable coating layer remaining on the intermediate imaged coated transfer sheet can be first transferred to the substrate. Thereafter, an opaque coating layer from an opaque transfer sheet can be transferred to the meltable coating layer on the substrate such that the opaque coating layer overlies the meltable coating layer and the meltable coating layer overlies the substrate.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
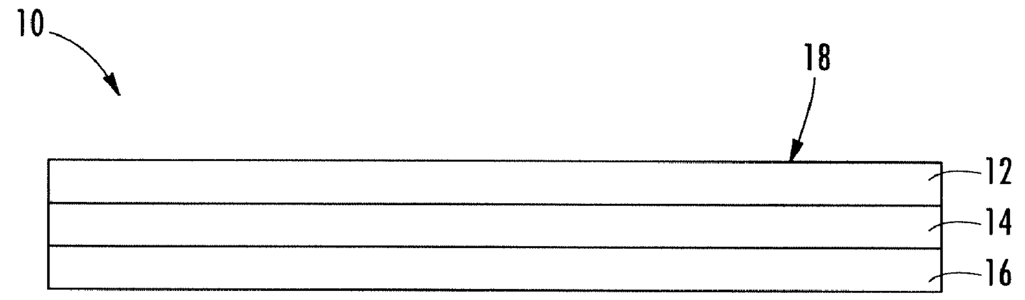
FIG. 1 shows an exemplary coating transfer sheet having a meltable coating layer.

Repeat use of reference characters in the present specification and drawings is intended to represent the same or analogous features or elements of the present invention.

DEFINITIONS

As used herein, the term "printable" is meant to include enabling the placement of an image on a material by any means, such as by direct and offset gravure printers, silk-screening, typewriters, laser printers, laser copiers, other toner-based printers and copiers, dot-matrix printers, and ink jet printers, by way of illustration. Moreover, the image composition may be any of the inks or other compositions typically used in printing processes.

The term "toner ink" is used herein to describe an ink adapted to be fused to the printable substrate with heat.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

DETAILED DESCRIPTION

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to methods of making substrates having opaque areas on their surfaces surrounded by uncoated, non-opaque areas. On dark substrates, the opaque areas can form an image on the substrate through contrast of the opaque areas with the dark background of the substrate. The opaque areas include an opaque layer that is particularly useful for forming or applying an image to a colored and/or dark substrate. Specifically, the present disclosure is directed to methods of heat transferring an image to a substrate such that only the opaque areas of the substrate have a coating, leaving the non-opaque areas substantially free of any coating (e.g., free of any meltable coating layer). Thus, the methods disclose a weedable heat transfer method that can be easily performed by one of ordinary skill in the art without the need to cut any of the heat transfer sheets utilized in the process. Additionally, an opaque (e.g., white) image can be applied to the substrate without alignment of images or papers.

Since no cutting or weeding is required, nearly anyone having a simple toner printer and a heat press can utilize the following methods to produce their own customized image for heat transfer to a substrate. Thus, many users that are not currently able to utilize heat transfer methods for applying an image to a substrate can now produce customized images on substrates with their own images.

Additionally, through the control of the transfer of opaque layers to the substrate, colored and/or dark substrates can be imaged without applying a clear coating to other unimaged areas of the substrate.

The methods of the present invention generally involve three separate sheets with multiple heat transfers in order to apply the opaque coating to the substrate. The opaque coating is generally supplied from an opaque coating sheet. However, since the opaque coating is substantially non-adhesive (even at the transfer layers), a coating transfer sheet is utilized to provide a meltable coating layer to act as an adhesive layer between the substrate and the opaque coating. Finally, a toner printable sheet is utilized to form the image via laser printing a toner ink onto the toner printable sheet. The toner ink on the toner printable sheet is then utilized to ready the meltable coating layer on the coating transfer sheet.

Various intermediate transfer sheets can be formed during the methods of the present invention. The particular intermediate transfer sheets formed are dependent upon the method selected to form the image.

I. Coating Transfer Sheet

In order to produce a coated image on a substrate, a coating transfer sheet is utilized to provide a meltable coating layer to act as an adhesive between the substrate and the opaque coating layer.

An exemplary coating transfer sheet 10 is shown having a meltable coating layer 12 in FIG. 1. The meltable coating layer 12 overlays a release layer 14, which overlays a base layer 16. Thus, the meltable coating layer 12 defines an exterior surface 18 of the coating transfer sheet 10. Although shown as two separate layers in FIG. 1, the release layer 14 can be incorporated within the base layer 16, so that they appear to be one layer having release properties.

As mentioned above, the meltable coating layer 12 overlays the base layer 16 and the release layer 14. The basis weight of the meltable coating layer 12 generally may vary from about 2 to about 70 g/m$^2$. Desirably, the basis weight of the meltable coating layer 12 may vary from about 20 to about 50 g/m$^2$, more desirably from about 25 to about 45 g/m$^2$, and even more desirably from about 25 to about 45 g/m$^2$. The meltable coating layer 12 includes one or more coats or layers of a film-forming binder and a powdered thermoplastic polymer over the base layer and release layer. The composition of the coats or layers may be the same or may be different. Desirably, the meltable coating layer 12 will include greater than about 10 percent by weight of the film-forming binder and less than about 90 percent by weight of the powdered thermoplastic polymer. In one particular embodiment, the meltable coating layer 12 includes from about 40% to about 75% of the powdered thermoplastic polymer and from about 20% to about 50% of the film-forming binder (based on the dry weights), such as from about 50% to about 65% of the powdered thermoplastic polymer and from about 25% to about 40% of the film-forming binder.

In general, each of the film-forming binder and the powdered thermoplastic polymer can melt in a range of from about 65° C. to about 180° C. For example, each of the film-forming binder and powdered thermoplastic polymer may melt in a range of from about 80° C. to about 120° C. Manufacturers' published data regarding the melt behavior of film-forming binders or powdered thermoplastic polymers correlate with the melting requirements described herein. It should be noted, however, that either a true melting point or a softening point may be given, depending on the nature of the material. For example, materials such as polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined, for example, by ASTM Test Method E-28, is useful in predicting their behavior in the present invention.

The molecular weight generally influences the melting point properties of the thermoplastic polymer, although the actual molecular weight of the thermoplastic polymer can vary with the melting point properties of the thermoplastic polymer. In one embodiment, the thermoplastic polymer can have an average molecular weight of about 1,000 to about 1,000,000. However, as one of ordinary skill in the art would recognize, other properties of the polymer can influence the melting point of the polymer, such as the degree of cross-linking, the degree of branched chains off the polymer backbone, the crystalline structure of the polymer when coated on the base layer 16, etc.

The powdered thermoplastic polymer may be any thermoplastic polymer that meets the criteria set forth herein. For example, the powdered thermoplastic polymer may be a polyamide, polyester, ethylene-vinyl acetate copolymer, polyolefin, and so forth. In addition, the powdered thermoplastic polymer may consist of particles that are from about 2 to about 50 micrometers in diameter. Likewise, any film-forming binder may be employed which meets the criteria specified herein. In some embodiments, water-dispersible ethylene-acrylic acid copolymers can be used.

Other additives may also be present in the meltable coating layer. For example, surfactants may be added to help disperse some of the ingredients, especially the powdered thermoplastic polymer. For instance, the surfactant(s) can be present in the meltable coating layer up to about 20%, such as from about 2% to about 15%. Exemplary surfactants can include nonionic surfactants, such as a nonionic surfactant having a hydrophilic polyethylene oxide group (on average it has 9.5 ethylene oxide units) and a hydrocarbon lipophilic or hydrophobic group (e.g., 4-(1,1,3,3-tetramethylbutyl)-phenyl), such as available commercially as Triton® X-100 (Rohm & Haas Co., Philadelphia, Pa.). In one particular embodiment, a combination of at least two surfactants is present in the meltable coating layer.

A plasticizer may be also included in the meltable coating layer. A plasticizer is an additive that generally increases the flexibility of the final product by lowering the glass transition temperature for the plastic (and thus making it softer). In one embodiment, the plasticizer can be present in the meltable coating layer up to about 40%, such as from about 10% to about 30%, by weight. One particularly suitable plasticizer is 1,4-cyclohexane dimethanol dibenzoate, such as the compound sold under the trade name Benzoflex 352 (Velsicol Chemical Corp., Chicago). Likewise, viscosity modifiers can be present in the meltable coating layer. Viscosity modifiers are useful to control the rheology of the coatings in their application. Also, ink viscosity modifiers are useful for ink jet printable heat transfer coatings, as described in U.S. Pat. No. 5,501,902. A particularly suitable viscosity modifier for ink jet printable coatings is high molecular weight poly(ethylene oxide), such as the compound sold under the trade name Alkox R400 (Meisei Chemical Works, Ltd). The viscosity modifier can be included in any amount, such as up to about 5% by weight, such as about 1% to about 4% by weight.

The release layer 14 is generally included in the coating transfer sheet 10 to facilitate the release of a portion of the meltable coating layer 12 in the first transfer and then the release of the remaining meltable coating layer 12 in the second transfer (as explained in greater detail below). The release layer 14 can be fabricated from a wide variety of materials well known in the art of making peelable labels, masking tapes, etc. In one embodiment, the release layer 14 has essentially no tack at transfer temperatures. As used herein, the phrase "having essentially no tack at transfer temperatures" means that the release layer 14 does not stick to the overlying meltable coating layer 12 to an extent sufficient to adversely affect the quality of the transfer. In order to function correctly, the bonding between the meltable coating layer 12 and the release layer 14 should be such that about 0.01 to 0.3 pounds per inch of force is required to remove the meltable coating layer 12 from the base layer 16 after transfer. If the force is too great, the meltable coating layer 12 or the base layer 16 may tear when it is removed, or it may stretch and distort. If it is too small, the meltable coating layer 12 may undesirably detach in processing. The peel force can be measured by, for example, applying a pressure sensitive tape to the meltable coating and using a device (such as an Instron tensile testor) to measure the peel force.

The layer thickness of the release layer is not critical and may vary considerably depending upon a number of factors including, but not limited to, the base layer 16 to be coated, and the meltable coating layer 12 applied to it. Typically, the release layer has a thickness of less than about 2 mil (52 microns). More desirably, the release layer has a thickness of about 0.1 mil to about 1.0 mil. Even more desirably, the release layer has a thickness of about 0.2 mil to about 0.8 mil. The thickness of the release layer may also be described in terms of a basis weight. Desirably, the release coating layer has a basis weight of less than about 45 $g/m^2$, such as from about 2 to about 30 $g/m^2$.

Optionally, the coating transfer sheet 10 may further include a conformable layer (not shown) between the base layer 16 and the release layer 14 to facilitate the contact between the meltable coating layer 12 and the opposing surface contacted during heat transfer.

The base layer 16 can be any sheet material having sufficient strength for handling the coating of the additional layers, the transfer conditions, and the separation of the meltable coating layer 12 and opposing surface contacted during heat transfer. For example, the base layer 16 can be a film or cellulosic nonwoven web. The exact composition, thickness or weight of the base is not critical to the transfer process since the base layer 16 is discarded. Some examples of possible base layers 16 include cellulosic non-woven webs and polymeric films. A number of different types of paper are suitable for the present invention including, but not limited to, common litho label paper, bond paper, and latex saturated papers. Generally, a paper backing of about 4 mils thickness is suitable for most applications. For example, the paper may be the type used in familiar office printers or copiers, such as Avon White Classic Crest® (Neenah Paper, Inc.), 24 lb per 1300 sq ft.

The layers applied to the base layer 16 to form the coating transfer sheet 10 may be formed on a given layer by known coating techniques, such as by roll, blade, Meyer rod, and air-knife coating procedures. The resulting image transfer material then may be dried by means of, for example, steam-heated drums, air impingement, radiant heating, or some combination thereof.

An image may, in one embodiment, be printed onto the coating transfer sheet, as a mirror image of the coated image which will ultimately be transferred to the final substrate. This image may be engineered to show through the overlying opaque layer on the final imaged substrate through the use of "dye sublimination" inks. An image can be printed onto the coating transfer sheet (e.g., ink jet printing), and registered with the negative image formed from the toner ink on the laser printable sheet, such as disclosed in U.S. patent application Ser. No. 11/923,795 filed on Oct. 25, 2007, which is incorporated by reference herein. The dyes from the dye sublimation inks can diffuse or sublime through the non-adhesive opacified layer in the final transfer step. Thus, this image could be visible on the final coated substrate. One of ordinary skill in the art would be able to produce and print such a mirror image, using any one of many commercially available software picture/design programs. Due to the vast availability of these printing processes, nearly every consumer easily can produce his or her own image to make a coated image on a substrate.

Examples of suitable dye sublimation inks are available under the name ChromaBlast™ (Sawgrass Technologies, Inc., Charleston, S.C.).

When utilized, the image formed from the dye sublimation ink on the meltable coating layer 12 can be digitally printed onto the coating transfer sheet via an ink-jet printer. Digital ink-jet printing is a well-known method of printing high quality images. Of course, any other printing method(s) can be utilized to print an image onto the printable sheet, including, but not limited to, flexographic printing, direct and offset gravure printers, silk-screening, typewriters, toner-based printers and copiers, dot-matrix printers, and the like. Typically, the composition of the ink will vary with the printing process utilized, as is well known in the art.

II. First Heat Transfer

A toner printable sheet is utilized to remove a portion of the meltable coating layer 12 from the coating transfer sheet 10 in a first heat transfer. Toner ink is printed onto a toner printable sheet such that the unimaged areas of the toner printable sheet will correspond to the opaque areas on the final imaged substrate (either directly correspond or indirectly correspond as a mirror image, depending on the application technique selected, as discussed below).

Figure 2:
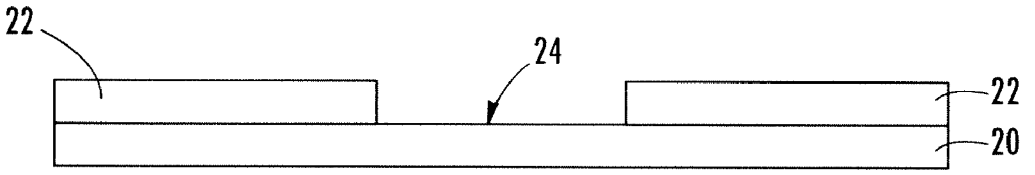
FIG. 2 shows an exemplary toner printable sheet having a toner image on its printable surface.

The negative image is printed onto a toner printable sheet via a laser printer or a laser copier. For example, referring to FIG. 2, a toner printable sheet 20 is shown having the negative image defined by the toner ink 22. The unimaged areas 24 define a positive image on the toner printable sheet 20 that corresponds (either directly or indirectly) to the image to be applied to the substrate, as discussed below. One of ordinary skill in the art would be able to produce the negative mirror image though the use of any one of several commercially available software programs or copy machines.

Toner printable sheets are readily available commercially for use with laser printers and copiers. Generally, the toner printable sheet can be a cellulosic nonwoven web (e.g. paper). The exact composition, thickness or weight of the toner printable sheet is not critical to the transfer process since the toner printable sheet can be discarded after the first transfer step.

A number of different types of paper are suitable for the toner printable sheet including, but not limited to, common litho label paper, bond paper, and latex saturated papers. Generally, a paper of about 4 mils thickness is suitable for most applications. For example, the paper may be the type used in familiar office printers or copiers, such as Neenah Paper's Avon White Classic Crest, 24 lb per 1300 sq ft.

The use of toner ink 22 provides the toner printable sheet 20 an adhesive quality to its imaged surface where the toner ink 22 is present since the toner ink 22 becomes tacky at elevated temperatures. However, the temperatures required to make the toner ink 22 tacky are less than the melting point of the powdered thermoplastic polymer of the meltable coating layer 12.

Figure 3:
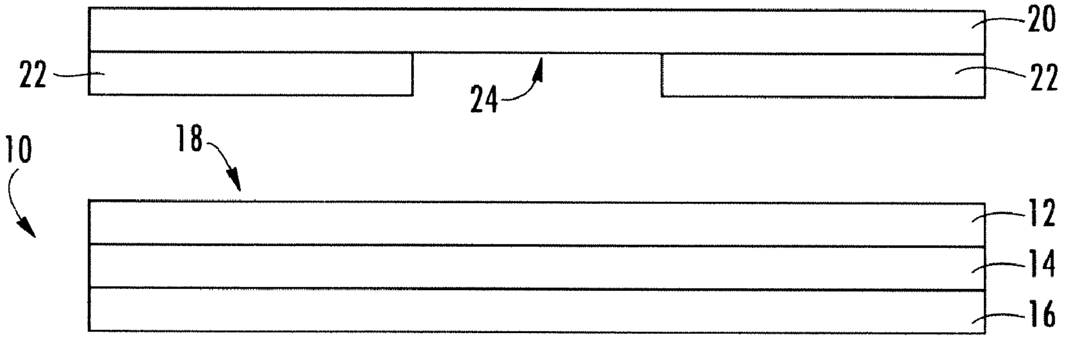
FIG. 3 shows the placement of the coating transfer sheet of FIG. 1 and the toner printable sheet of FIG. 2 to form a first temporary laminate.

Since it is desired to have the meltable coating layer 12 present on the final substrate only in the areas where the opaque layer will be, a portion of the meltable coating layer 12 is removed from the coating transfer sheet 10 by the negative image on the toner printable sheet 20. In order to accomplish removal of this portion of the meltable coating layer 12 from the coating transfer sheet 10, the coating transfer sheet 10 and the toner printable sheet 20 are aligned such that the exterior surface 18 of the meltable coating layer 12 will contact the toner ink 22 and the unimaged areas 24 of the toner printable sheet 20, as shown in FIG. 3.

When an image is present on the meltable coating layer 12, then this image is registered with the negative image formed by the toner ink 22 on the toner printable sheet 20. As used herein, the term "registered" means that the image defined by the ink on the exterior surface 18 of the coating transfer sheet 10 is substantially matched with the unimaged areas 24 on the toner printable sheet 20. For example, the coating transfer sheet 10 and the toner printable sheet 20 are aligned face to face such that only the unimaged areas 24 of the toner printable sheet 20 contact the dye sublimation ink on the meltable coating layer 12 of the coating transfer sheet 10. Likewise, the toner ink 22 on the toner printable sheet 20 contacts the unimaged areas of the meltable coating layer 12 of the coating transfer sheet 10. Of course, some minimal amount of overlap may occur without significantly affecting the remaining transfer steps, depending on the complexity of the image. In addition, if a white opaque background or other portion image is desired to be transferred to the substrate, such portions can be obtained by leaving a non-printed area of the meltable coating layer 12 corresponding to a unimaged area of the toner printable sheet 20.

Figure 4:
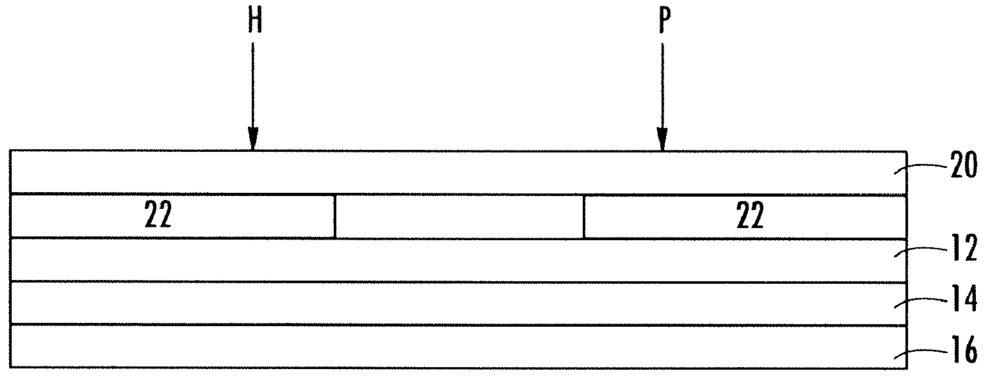
FIG. 4 represents the first heat transfer step involving the toner printable sheet of FIG. 2 and the coating transfer sheet of FIG. 1.
Figure 5:
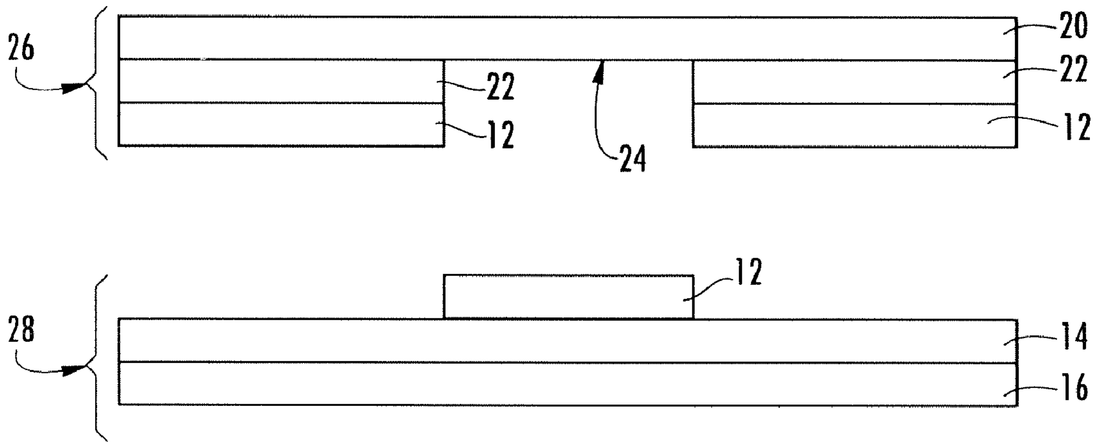
FIG. 5 shows the intermediate imaged coated transfer sheet and the coated toner printed sheet resulting from the separation of the layers of the temporary laminate of FIG. 4.

Once placed in contact with each other, heat H and pressure P are applied to the sheets forming a temporary laminate, such as shown in FIG. 4. The application of heat H and pressure P laminates the coating transfer sheet 10 and the toner printable sheet 20 together as a temporary laminate. The heat H and pressure P cause the toner ink 22 to adhere to the meltable coating layer 12 in the temporary laminate. Upon separation (e.g., peeling apart) of the coating transfer sheet 10 from the toner printable sheet 20, a coated toner printed sheet 26 and an intermediate imaged coated transfer sheet 28 are produced, as shown in FIG. 5.

The meltable coating layer 12 has been removed from the coating transfer sheet 10 to form an intermediate imaged coated transfer sheet 28 having the meltable coating layer 12 remaining only in those areas where the toner ink 22 did not contact the meltable coating layer 12. Since the toner ink 22 was applied as a negative image to the toner printable sheet 20, the remaining meltable coating layer 12 on the intermediate imaged coated transfer sheet 28 forms an image on the intermediate imaged coated transfer sheet 28 (i.e., the positive image is formed on the intermediate imaged coated transfer sheet 28). The remaining meltable coating layer 12 on the intermediate imaged coated transfer sheet 28 formed from this separation supplies the adhesion between the opaque material and the substrate on the final product. Likewise, the toner ink 22 on the toner printable sheet 20 is now coated with the meltable coating layer 12 from the coating transfer sheet 10 to form the coated toner printed sheet 26, and the unimaged areas 24 of the toner printable sheet 20 are free of any coating. This coated toner printed sheet 26 may be discarded, as the usefulness of the toner printable sheet 20 has been completed (the excess meltable coating layer 12 has been removed from the coating transfer sheet 10).

The temperature required to form the temporary laminate and adhere the meltable coating layer 12 from the coating transfer sheet 10 to the inked areas defined by the toner ink 22 of the toner printable sheet 20 is generally below the melting and/or softening point of the thermoplastic particles in the meltable coating layer 12. For example, the transfer temperature (i.e., H) can be from about 50° C. to about 150° C., such as from about 80° C. to about 120° C. At this temperature, it is believed that the toner ink 22 softens and melts to become tacky, sufficiently adhering to the meltable coating layer 12 contacting the imaged areas of the toner printable sheet 20. Thus, after separation, the inked areas (i.e., the negative image defined by the toner ink 22) of the toner printable sheet 20 adhere to the meltable coating layer 12 of the coating transfer sheet 10, effectively removing these areas from the coating transfer sheet 10. On the other hand, the areas of the meltable coating layer 12 contacting the unimaged areas 24 of the toner printable sheet 20 and are not adhered to the toner printable sheet 20. Thus, after separation, only the imaged areas of the meltable coating layer 12 remain on the coating transfer sheet 10 to form the intermediate imaged coated transfer sheet 28.

III. Heat Transfer of Opaque Areas to a Substrate

Figure 6:
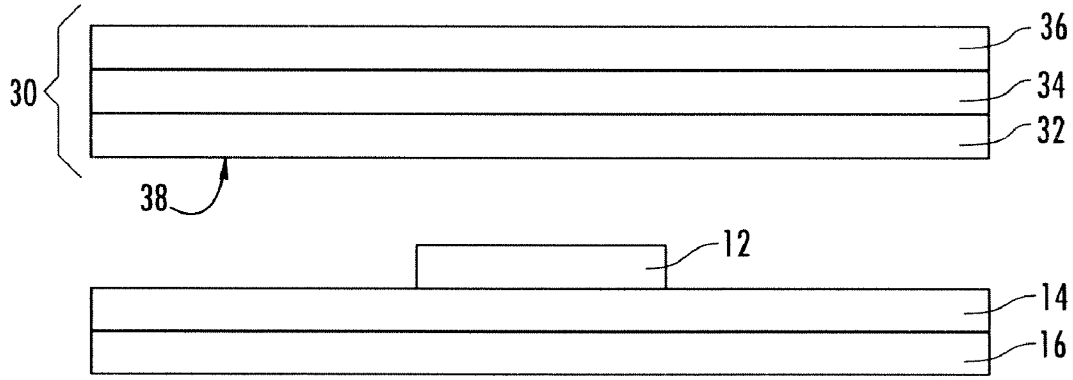
FIGS. 6-10 sequentially represent the heat transfer steps for transferring an image to a substrate according to one embodiment.
Figure 13:
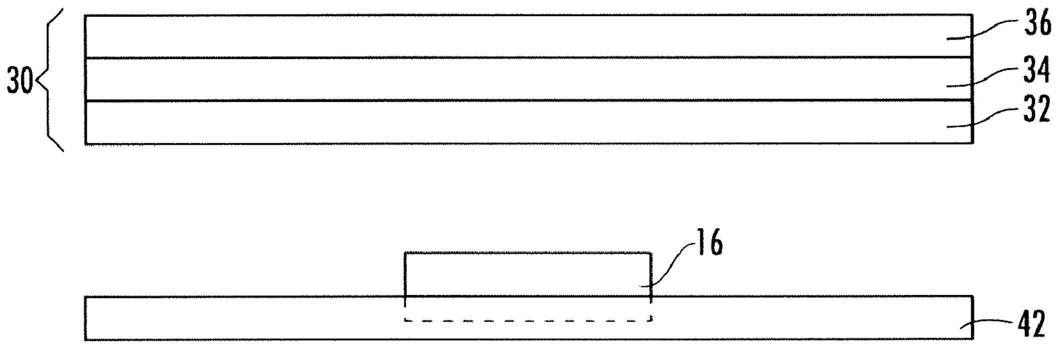

The intermediate imaged coated transfer sheet 28 may now be utilized to supply adhesion between an opaque image and a substrate. The opaque layer is supplied from an opaque transfer sheet 30 having an opaque coating layer 32, as shown in FIGS. 6 and 13. The opaque coating layer 32 overlies the reinforcement layer 34 and the base sheet 36.

The opaque coating layer 32 includes an opacifier. The use of opaque layers in heat transfer materials for decoration of dark colored fabrics is described in U.S. Pat. No. 7,364,636 of Kronzer, which is incorporated by reference herein. The opacifier is a particulate material that scatters light at its interfaces so that the transfer coating is relatively opaque. Desirably, the opacifier is white and has a particle size and density well suited for light scattering. Such opacifiers are well known to those skilled in the graphic arts, and include particles of minerals such as aluminum oxide and titanium dioxide or of polymers such as polystyrene. The amount of opacifier needed in each case will depend on the desired opacity, the efficiency of the opacifier, and the thickness of the transfer coating. For example, titanium dioxide at a level of approximately 20 percent in a film of one mil thickness provides adequate opacity for decoration of black fabric materials. Titanium dioxide is a very efficient opacifier and other types generally require a higher loading to achieve the same results.

No matter the particular opacifier present in the opaque coating layer 32, the opaque coating layer 32 does not substantially melt and/or flow at the transfer temperatures. Thus, the opaque coating layer 32 will not effectively adhere nor attach to the substrate without the use of a separate layer(s) between the opaque coating layer 32 and the substrate (e.g., the meltable coating layer 12). This construction of the opaque coating layer 32 will ensure that the opaque coating layer 32 remains on the surface of the substrate to maximize its visibility.

In one particular embodiment, the opaque coating layer 32 includes a cross-linked polymeric material. The crosslinked, opaque layer is designed to inhibit graying and loss of opacity of the image when used on a dark colored substrate. Such an opaque coating layer 32 can include a polymeric binder, a crosslinking agent, and an opacifying material. The crosslinking agent reacts with the polymeric binder to form a 3-dimensional polymeric structure, which may soften with heat but does not flow appreciably into the substrate. If flow into the fabric occurs, the white image can become less distinct or washed out in appearance. Crosslinking agents that can be used in the present invention include, but are not limited to, polyfunctional aziridine crosslinking agents (e.g., XAMA 7 from Sybron Chemical Co., Birmingham, N.J.), multifunctional isocyanates, epoxy resins, oxazolines, and melamine-formaldehyde resins. Another exemplary crosslinking agent is the water-soluble epoxy available under the name CR5L (Esprit Chemical Company, Sarasota, Fla.). In one embodiment, a combination of crosslinking agents may be used, to facilitate the crosslinking of the polymeric material to a sufficient degree ensuring that the crosslinked layer does not melt or flow at the transfer temperatures.

The amounts of crosslinkers in the non-adhesive coating can be varied. The amount in the preferred embodiment above is near the minimum amount needed to make the coating non-adhesive at the transfer temperature (e.g., from about 150° C. to about 250° C.). However, the use of more crosslinker than required may increase the probability of the "slivering" in the edges of the image. Even so, it is thought that about 5 times as much crosslinker than required would be acceptable in some applications.

For example, the crosslinkable polymeric binder may contain carboxyl groups, and the crosslinking agent may be one which reacts with carboxyl groups, such as an epoxy resin, a multifunctional aziridine, a carbodiimide or an oxazoline functional polymer. The amount of crosslinking agent needed will vary depending on the polymeric binder and the effectiveness of the crosslinking agent. For example, a polyfunctional aziridine such as XAMA 7 (Sybron Chemical Co., Birmingham, N.J.), is effective at levels of only a few percent. Other crosslinking agents, such as epoxy resins, usually are required in an amount of from about 1 percent to around 20 percent by weight, depending on the carboxylated polymer. Other types of crosslinking reactions include those between polymers having hydroxyl groups and melamine-formaldehyde, urea formaldehyde or amine-epichlorohydrin crosslinking agents. Hydroxyl functional polymers can also be crosslinked with multifunctional isocyanates, but the isocyanates require a water-free solvent since they react with water.

Other dispersions of polymers having carboxyl groups are available in many varieties, including acrylics (such as Carboset resins from B. F. Goodrich, Inc., Cleveland, Ohio), polyurethanes (K. J. Quinn and Company, Seabrook, N.H.) and ethylene-acrylic acid copolymers (such as those sold under the name Michem Prime by Michleman Chemical Co., Cincinnati, Ohio). As mentioned above, the amount of crosslinking agents needed can vary depending on the polymer and the carboxyl content. For example, Michem Prime 4983 from Michleman Chemical requires only one to three percent XAMA-7 crosslinking agent.

In one particular embodiment, relatively large polymer particles which do not melt at the transfer temperature may be included in the opaque coating layer 32. These particles may be made of crosslinked polymers, to raise the melting point of the polymer particle. For example, the relatively large polymer particles may have average particle sizes of greater than about 1 micron, such as from about 5 microns to about 30 microns. Exemplary polymer particles include the crosslinked polyurethane particles available under the name Daiplacoat RHL from GSI Exim America, Inc., New York (e.g. Daiplacoat RHL 731 having an average particle size of 5 to 8 microns and Daiplacoat RHL 530 having an average particle size of 12 to 17 microns). Other exemplary polymer particles include the nylon 6 particles available under the name Orgasol 1002D NAT (Arkema Inc., Philadelphia, Pa.) having a particle size of 17 microns to 23 microns and melting at about 217° C.

The use of such large polymer particles may result in a cleaner separation of the opaque coating layer 32 to form the image on the substrate. Without wishing to be bound by theory, it is believed that the inclusion of these relatively large polymer particles facilitate separation of the layer, especially when crosslinked, during transfer to the substrate. The relatively large polymer particles may provide discontinuities in the opaque coating layer 32 (e.g., in the film or in the crosslinked network) facilitating separation of the opaque coating layer 32 during the transfer process. The relatively large polymer particles can provide cleaner, more distinct edges on the image formed on the substrate. Additionally, the inclusion of these relatively large polymer particles can allow for an increased thickness of the opaque coating layer 32, which can lead to increased opacity. For example, the thickness of the opaque coating layer 32 can be greater than about 0.5 mils, such as from about 0.5 mils to about 3 mils and from about 1 mil to about 2 mils.

The relatively large polymer particles can be included in the opaque coating layer 32 up to about 40% by weight of the opaque coating layer 32, such as from about 1% to about 25% by weight, and such as from about 5% to about 30% by weight.

In the present application, the amount of opacifier (e.g., titanium dioxide) can be relatively high, such as up to about 80% by weight. For example, the opacifier may be present in from about 20% to about 75%, such as from about 50% to about 75%. Cracking in this opaque coating layer 32 can be inhibited through the use of the optional reinforcing layer. In other embodiments, only a moderate amount of pigment is needed in the opaque coating layer 32. By moderate, from about 15% to about 60% by weight is meant, such as about 20% to about 40% by weight. This amount of pigment is enough to provide the required opacity provided that penetration of the pigmented layer into the fabric is prevented by crosslinking such as with a film thickness at about 0.5 to about 2 mils.

The thickness of the opaque coating layer 32 can be approximately 0.4 mils to about 2 mils. When cross-linked, the opaque coating layer 32 may contain the opacifier, a cross-linkable polymeric binder, and a crosslinking agent, desirably one which cures when heat is applied. Other materials, such as surfactants, dispersants, processing aides, etc. may also be present in the layer.

To provide the opacity needed for fabric decoration, the coating should remain substantially on the surface of the fabric. If, in the transfer process, the heat and pressure cause the coating to become substantially imbedded into the substrate, a dark color of the substrate can show through, giving the art a gray or chalky appearance. The coating should therefore resist softening to the point of becoming fluid at the desired transfer temperature. Recalling that the meltable coating layer 12, which will support the opaque coating layer 32 on the substrate, melts and/or flows onto the substrate at the transfer temperature (i.e., it is melt-flowable), the relationship needed between the meltable coating layer 12 and the opaque coating layer 32 becomes clear. The opaque coating layer 32 should not become fluid at or below the softening point of the meltable coating layer 12. The terms "fluid" and "softening point" are used here in a practical sense. By fluid, it is meant that the coating would flow onto the substrate (e.g., into the spacing between fibers of a fabric) easily. The term "softening point" can be defined in several ways, such as a ring and ball softening point. The ring and ball softening point determination is done according to ASTM E28. A melt flow index is useful for describing the flow characteristics of meltable polymers. For example, a melt flow index of from 0.5 to about 800 under ASTM method D 1238-82 is desired for the meltable coating layer 12. For the opaque coating layer 32, the melt flow index should be less than that of the meltable coating layer 12 by a factor of at least ten, desirably by a factor of 100, and most desirably by a factor of at least 1000. When crosslinked, the opaque coating layer 32 typically meets the desired characteristic of not appreciably flowing at the transfer temperatures due to formation of a cross-linked three-dimensional polymeric structure.

The opaque coating layer 32 is desirably applied to the base sheet 36 as a dispersion or solution of polymer in water or solvent, along with the dispersed opacifier, crosslinking agent, and any other materials. Many of the polymer types mentioned above are available as solutions in a solvent or as dispersions in water. For example, acrylic polymers and polyurethanes are available in many varieties in solvents or in water based latex forms. Other useful water based types include ethylenevinylacetate copolymer lattices, ionomer dispersions of ethylenemethacrylic acid copolymers and ethyleneacrylic acid copolymer dispersions. In many cases, washability and excellent water resistance of the decorated fabrics will be required. Polymer preparations which contain no surfactant, such as polyurethanes in solvents or amine dispersed polymers in water, such as polyurethanes and ethyleneacrylic acid dispersions can meet these requirements.

As shown in the Figures, an optional reinforcement layer 34 may be present between the opaque coating layer 32 and the base sheet 36. This additional reinforcement layer 34 can improve the separation of the opaque coating layer 32 from the base sheet 36 and can provide a protective coating on the portion of the opaque coating layer 32 transferred to the substrate. In one embodiment, the reinforcement layer 34 includes materials similar to those discussed above with reference to the meltable coating layer 12. Thus, the reinforcement layer 34 will soften and/or melt at the transfer temperature of the opaque coating layer 32 to the substrate. An opacifying material may also be added to the reinforcement layer 34 so as to provide some opacity to the layer. The opacifying material may, for example, be present in relatively moderate amounts (e.g., from about 15% to about 60% by weight, such as about 20% to about 40% by weight).

The softening and/or melting of the reinforcement layer 34 allows this layer to split (e.g., separate) upon transfer, leaving some of the reinforcement layer 34 on the base sheet 36 and some of the reinforcement layer 34 transferred onto the substrate. Although this splitting of the reinforcement layer 34 is not depicted in the Figures, for simplicity, one of ordinary skill in the art should recognize that the reinforcement layer 34 will split upon the transfer shown in either FIGS. 9-10 or FIGS. 14-15 leaving a portion of the reinforcement layer 34 on both the base sheet 36 and the transferred portion of the opaque coating layer 32 overlying the substrate 42. This transferred portion of the reinforcement layer 34 can help protect the underlying opaque coating layer 32 from wear on the substrate 42.

A release layer (not shown) may also be provided in conjunction with the base sheet 36 of the opaque transfer sheet 30.

As stated, the opaque coating layer 32 is applied to the substrate utilizing the remaining meltable coating layer 12 on the intermediate imaged coated transfer sheet 28 to adhere the opaque coating layer 32 to the surface of the substrate. The opaque coating layer 32 can be applied to any substrate (e.g., a porous substrate) using the methods of the present disclosure. Of course, the meltable coating layer 12 and the opaque coating layer 32 can be designed so as to be compatible with the particular substrate which one chooses to decorate. For example, a transfer designed for a coarse, heavy material will require a heavier coating than one designed for a very light material such as silk or a less porous material such as leather. In one particular embodiment, the substrate is a cloth, such as used to make clothing (e.g., shirts, pants, etc.). The cloth can include any fibers suitable for use in making the woven cloth (e.g., cotton fibers, silk fibers, polyester fibers, nylon fibers, etc.). For example, the substrate can be a T-shirt that includes cotton fibers.

The application of the opaque coating layer 32 is particularly useful for the decoration of colored (i.e., non-white) substrates. Specifically, the opacity of the opaque coating layer 32 can provide contrast to such colored substrates, particularly darker colored substrates (e.g., black, browns, blues, reds, greens, purples, etc.).

The final opaque image can be formed on the substrate according to either of two methods, each with similar results. These two methods include either the use of a second intermediate transfer sheet or double heat transfer to the substrate:

A. Use of a Second Intermediate Transfer Sheet

Figure 16:
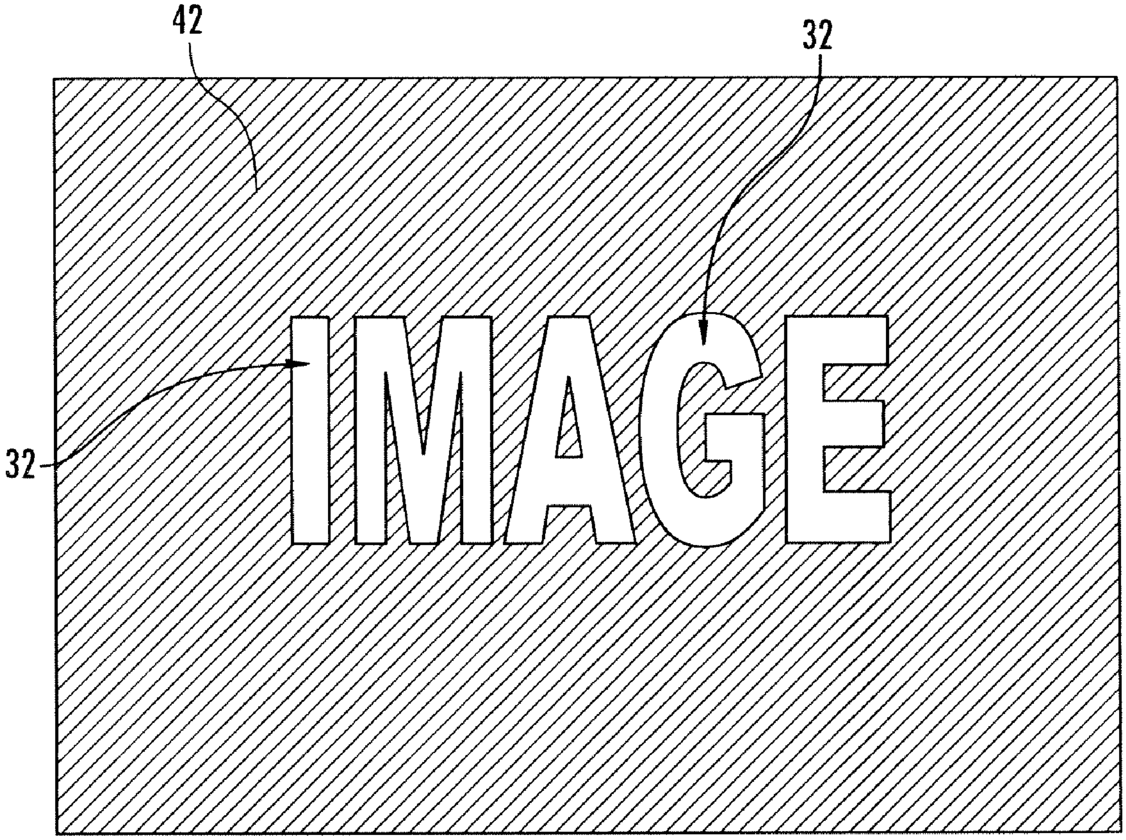
FIG. 16 shows an exemplary imaged substrate having imaged areas defined by the opaque coating layer.

One particularly suitable method of forming an opaque image on a substrate is depicted sequentially in FIGS. 6-10 to form a final substrate as shown FIG. 16. This method involves forming a second intermediate transfer sheet for transfer of an opaque coating to the substrate. Since the meltable coating layer 12 is transferred twice more in this process (for a total of 3 transfers of the meltable coating layer 12), the negative image formed by the toner ink 22 on the toner printable sheet 20 will indirectly correspond to the image defined by the opaque areas on the imaged substrate. That is, a mirror, negative image is printed onto the toner printable sheet 20 with the toner ink 22. Thus, upon the first transfer described above, the meltable coating layer 12 remaining on the intermediate imaged coated transfer sheet 28 directly corresponds to the image that will be on the final imaged substrate.

Figure 7:
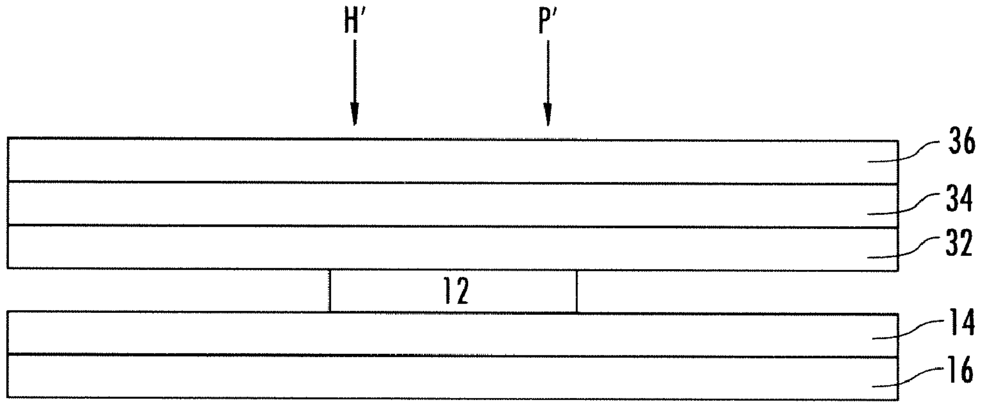

An opaque transfer sheet 30 is positioned adjacent to the intermediate imaged coated transfer sheet 28 such that the exposed surface 38 of the opaque coating layer 32 contacts the remaining meltable coating layer 12 on the intermediate imaged coated transfer sheet 28, as shown in FIGS. 6 and 7. Heat H' and pressure P' are applied to form a second temporary laminate. The heat H' applied to this second laminate is at a temperature sufficient to soften and/or melt the remaining meltable coating layer 12, enabling the meltable coating layer 12 to adhere to the opaque coating layer 32 of the opaque transfer sheet 30. In one embodiment, this second transfer can be conducted at a temperature greater than about 120° C., such as from about 150° C. to about 200° C.

Figure 8:
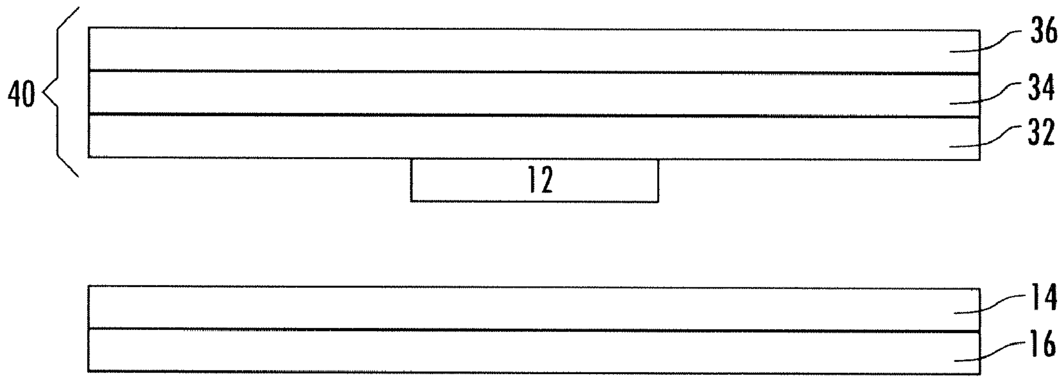

This second temporary laminate can then be separated (e.g. peeled apart) to form an intermediate melt-coated opaque transfer sheet 40, as shown in FIG. 8. This intermediate melt-coated opaque transfer sheet 40 is then utilized to transfer the opaque coating layer 32 to the substrate 42.

The intermediate imaged coated transfer sheet 28, now without its meltable coating layer 12, can now be discarded, since the intermediate imaged coated transfer sheet 28 served its purpose of providing an adhesive-like layer (i.e., the remaining meltable coating layer 12) to the opaque coating layer 32 of the opaque transfer sheet 30.

The intermediate melt-coated opaque transfer sheet 40 has an image formed by the presence of the meltable coating layer 12 on the exposed surface 38 of the opaque coating layer 32. This image is the mirror image of the image to be applied to the substrate. The meltable coating layer 12 can now act as an adhesive to secure the opaque coating layer 32 to the substrate 42 only in those areas where the meltable coating layer 12 is present. Thus, the opaque coating layer 32 can be applied to the substrate 42 to form the image.

Figure 9:
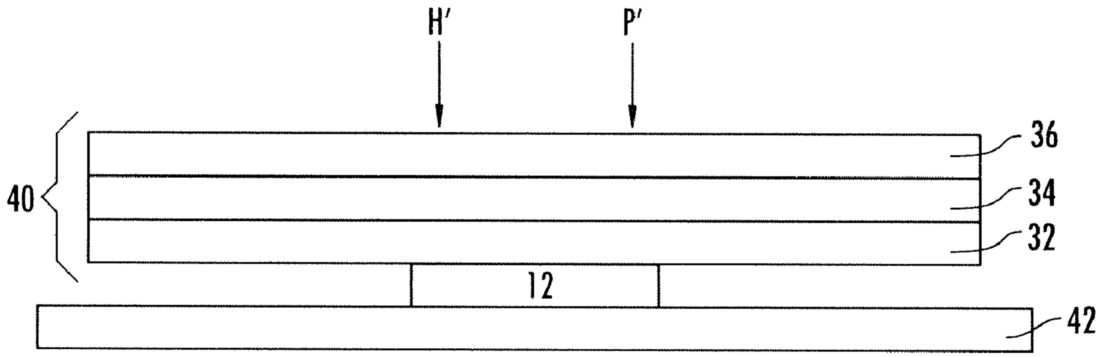
Figure 10:
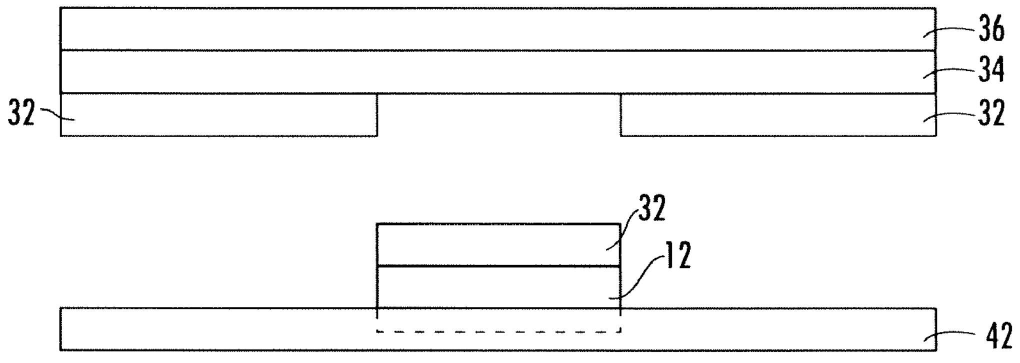

To achieve transfer of the opaque coating layer 32 to the substrate 42, the intermediate melt-coated opaque transfer sheet 40 is positioned adjacent to the substrate 42 such that the meltable coating layer 12 contacts the substrate 42, as shown in FIG. 9. Upon application of heat H' and pressure P', the meltable coating layer 12 softens to allow it to adhere or otherwise attach to the substrate 42. Heat is applied at a temperature sufficient to soften and/or melt the meltable coating layer 12 onto the substrate 42 substrate. In one embodiment, this transfer can be conducted at a temperature greater than about 120° C., such as from about 150° C. to about 200° C.

The intermediate melt-coated opaque transfer sheet 40 can then be separated (e.g., peeled apart) to leave the meltable coating layer 12 overlying the substrate 42 and the opaque coating layer 32 overlying the meltable coating layer 12 to form the opaque coated substrate 44.

Since the opaque coating layer 32 does not soften and/or flow at the transfer temperature, the portion of opaque coating layer 32 on the intermediate melt-coated opaque transfer sheet 40 that is free of the meltable coating layer 12 is not transferred to the substrate 42. Thus, only the portion of the opaque coating layer 32 contacting the meltable coating layer 12 is transferred, resulting in the substrate 42 having an image defined by the transferred portion of the opaque coating layer 32.

B. Double Heat Transfer to the Substrate

An alternative method utilized two heat transfers to the substrate is depicted sequentially in FIGS. 11-15 to form the same final substrate as shown in FIG. 16. This method involves applying the remaining meltable coating layer 12 on the intermediate imaged coated transfer sheet 28 to the substrate in a first heat transfer step. Then, a second heat transfer step is utilized to apply the opaque coating layer 32 to the meltable coating layer 12 already transferred to the substrate.

Figure 11:
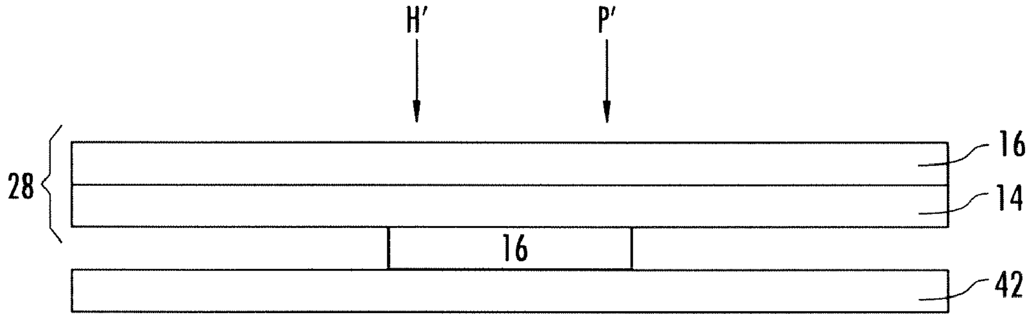
FIGS. 11-15 sequentially represent alternative heat transfer steps for transferring an image to a substrate.

Referring to FIG. 11, the intermediate imaged coated transfer sheet 28 is positioned adjacent to a substrate 42 such that the remaining meltable coating layer 12 defining the image contacts the substrate 42. A first substrate heat transfer of the remaining meltable coating layer 12 defining the image on the intermediate imaged coated transfer sheet 28 is accomplished by applying heat H' and pressure P' to the intermediate imaged coated transfer sheet 28 at a first transfer temperature to the substrate 42.

Figure 12:
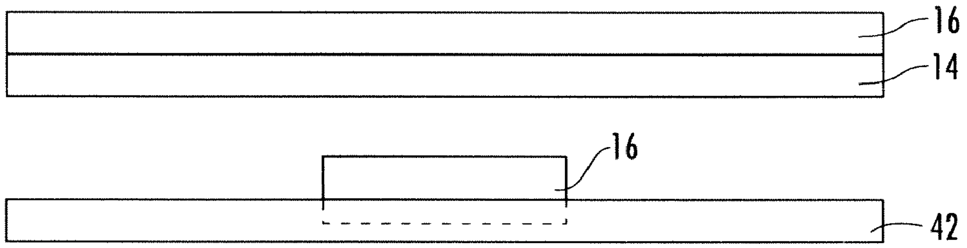

After separation (e.g., peeling the intermediate imaged coated transfer sheet 28 from the substrate 42), the substrate 42 has an image defined by the meltable coating layer 12, as shown in FIG. 12. The surrounding surface areas of the substrate 42 are free of meltable coating layer 12. Thus, no excess meltable coating layer 12 is applied to the substrate 42. Since only one additional transfer of the meltable coating layer 12 is required according to this process (for a total of 2 transfers), the negative image defined by the unimaged areas 24 on the toner printable sheet 20 directly corresponds to the image formed on the final imaged substrate. Thus, a negative image is printed by the toner ink 22 on the toner printable sheet 20 (and not a negative, mirror image).

The first substrate transfer is performed at a temperature sufficient to soften and/or melt the remaining meltable coating layer 12 onto the substrate 42 substrate. In one embodiment, this first substrate transfer can be conducted at a temperature greater than about 120° C., such as from about 150° C. to about 200° C.

Figure 14:
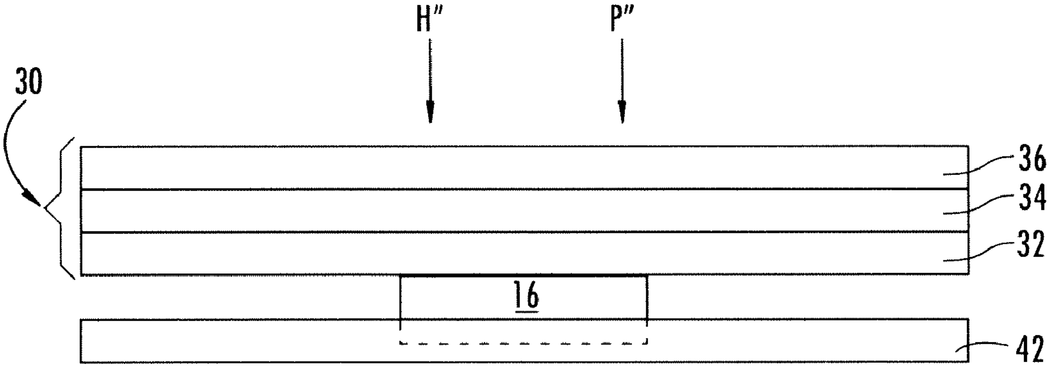
Figure 15:
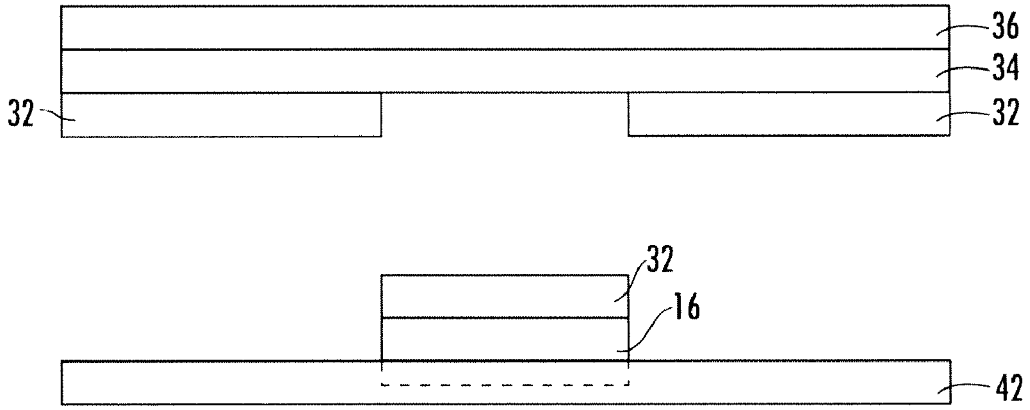

The opaque layer is then formed on the substrate 42 via a second substrate heat transfer utilizing an opaque transfer sheet 30. The opaque transfer sheet 30 is positioned adjacent to the coated substrate 42, such that the opaque coating layer 32 contacts the meltable coating layer 12 on the substrate 42, as shown in FIGS. 13 and 14. Upon application of heat H" and P" to the base sheet 36 of the opaque transfer sheet 30, the meltable coating layer 12 softens sufficiently to adhere to the opaque coating layer 32. Then, the opaque transfer sheet 30 can be separated (e.g., peeled away) from the substrate 42 leaving the opaque coating layer 32 overlying the meltable coating layer 12 on the substrate 42. The meltable coating layer 12 effectively acts as an adhesion layer bonding the opaque coating layer 32 to the substrate 42

Like the first substrate transfer, the second substrate transfer is performed at a temperature sufficient to soften and/or melt the remaining meltable coating layer 12 onto the substrate 42 substrate. In one embodiment, this second transfer can be conducted at a temperature greater than about 120° C., such as from about 150° C. to about 200° C.

The opaque coating layer 32 transferred to the surface of the substrate 42 forms an image as shown in FIG. 16.

The present invention may be better understood with reference to the following examples.

EXAMPLES

The following examples are provided to show an exemplary application of an opaque image to a substrate.

Example 1

Example 1 generally follows the application of an opaque image to a substrate following the sequential method shown in FIGS. 1-5 and 11-16. The coating transfer sheet was an inkjet printable paper having a base sheet of cellulosic paper sheet available commercially under the name Classic Crest® super smooth (Neenah Paper, Inc., Alpharetta, Ga.). This had an extruded coating of low density polyethylene, 1 mil thick, overlying the base paper. Over the polyethylene coating was a release coating consisting of 2.5 lb. per 1300 sq. ft. of 100 dry parts of an acrylic latex available as Hycar® 26706 (The Lubrizol Corporation, Wickliffe, Ohio), 5 dry parts of a polyfunctional aziridine crosslinker available under the name XAMA 7 (The Lubrizol Corporation, Wickliffe, Ohio), and 2 dry parts of a release agent available under the name Silicone Surfactant 190 (Dow Corning Corp., Midland, Mich.). The meltable coating layer was 30 dry parts of an ethylene acrylic acid dispersion available under the name Michem Prime 4983 (Michleman Chemical Co., Cincinnati, Ohio), 100 dry parts of a powdered polyamide available under the name Orgasol 3502 D Nat (Arkema Inc., Philadelphia, Pa.), 3 dry parts of a hydroxypropyl cellulose available under the name Klucel G (Aqualon Group of Hercules Inc., Wilmington, Del.), 5 dry parts of a surfactant available as Tergitol 15S 40 (Dow Chemical Company, Midland, Mich.), and 3 dry parts of a cationic polymer believed to be a poly(dimethyl diallylammonium chloride) homopolymer available under the name Glascol F 207 (Ciba Specialty Chemicals, Suffolk, Va.). The coating weight was 7.5 lb. per 1300 square feet. This coating was mixed at approximately 30% total solids.

The second transfer paper was super smooth Classic Crest® (Neenah Paper, Inc.) with a co-extruded meltable polymer coating. The first co-extruded layer, against the paper, was 7 lb. per 1300 square feet of an ethylene-methacrylic acid copolymer available under the name Nucrel 599 (E.I. du Pont de Nemours and Company, Wilmington, Del.). The second coextruded layer was 3.5 lb. per 1300 square feet of an ethylene-acrylic acid copolymer available under the name Primacor 5981I (Dow Chemical Co., Midland, Mich.). The non-adhesive, opaque coating layer was 6 lb. per 1300 square feet consisting of 100 dry parts a titanium dioxide powder available under the name Ti-Pure® RPS Vantage® R-900 (E.I. du Pont de Nemours and Company, Wilmington, Del.), 0.5 dry parts of a hydrophobic dispersant believed to be a sodium salt of a maleic anhydride copolymer available under the name Tamol 731 (Rohm and Haas, Philadelphia, Pa.), 40 dry parts of an ethylene acrylic acid dispersion available under the name Michem Prime 4983 (Michleman Chemical Co., Cincinnati, Ohio), 0.5 dry parts of a polyfunctional aziridine crosslinker available under the name XAMA 7 (The Lubrizol Corporation, Wickliffe, Ohio), 0.5 dry parts of an epoxy resin available as CR5L (Esprix Technologies, Sarasota, Fla.), 0.025 parts of an epoxy curing agent believed to be 2-methyl-imidazole available under the name Imicure® AMI 2 (Air Products and Chemicals, Inc., Allentown, Pa.) and 15 dry parts of a crosslinked polyurethane available under the name Daiplacoat EHC 731 (GSI Exim America, Inc., New York, N.Y.). This coating was mixed at approximately 40% total solids.

The toner printable paper used was 24 lb. Classic Crest® Super Smooth (Neenah Paper, Inc.). A black image "negative" was printed on to the toner printable paper with a Lexmark C782 printer. This printed sheet was pressed in a heat press for 20 seconds with firm pressure at 250° F. (about 121° C.) against the coated side of the first transfer paper. After cooling, the coating from the first transfer paper was transferred to the black image areas only of the laser printing. The first transfer paper was then pressed onto a black Tee shirt fabric for 25 seconds at 375° F. (about 191° C.), cooled and the coating corresponding to the non-imaged areas of the toner printable paper was transferred to the fabric. In a third step, the second transfer paper was pressed onto the fabric having the first transfer coating for 25 seconds at 375° F. (about 191° C.) and then removed while still hot. The white, opaque layer and part of the extruded layer (melted at the time the paper was removed) was thus transferred only to the areas bearing the first transfer coating, giving a white image.

Example 2

Example 2 generally follows the application of an opaque image to a substrate following the sequential method shown in the sequential method shown in FIGS. 1-10 and 16.

The first step was repeated as in the first example. In the second step, the first transfer paper bearing the coating remaining after the first step was heat pressed against transfer paper two face to face in a heat press for 25 seconds at 375° F. (about 191° C.). After cooling, the coating from the first heat transfer paper was transferred to the second transfer paper upon separation of the papers. Then, pressing now coated second transfer paper onto the black tee shirt fabric for 25 seconds at 375° F. (about 191° C.) and removal of the paper while still hot provided the white image on the black fabric. This procedure produces an intermediate, after the second step. Adhesion between the top, non adhesive, opaque coating of the second transfer paper and the meltable transfer coating of the first transfer paper may be improved because the coatings are heat pressed together before transfer to the substrate.

Variations

Variations to the formulations above (in both Example 1 and 2) included omitting the Daiplacoat RHC 731 from the non-adhesive coating, resulting in an acceptable transfer. However, the coating weight was limited to about 3 lbs. per 1300 square feet. Heavier coatings resulted in 'slivers' of coating overlapping the image edges in the final transfer step. This is probably because the coating film was too strong to separate cleanly.

Another variation was addition of Titanium Dioxide R900 mentioned above to a non-crosslinked layer between the non-adhesive opaque layer and the meltable layer. This gave a second transfer paper having an opacified meltable layer and an opacified non-adhesive layer. This made it possible to obtain additional opacity so that the coating weight of the non-adhesive opacified layer could be reduced to about 3# per 1300 square feet. Thus, no Daiplacoat RHC 731 or other non-meltable polymer particles were needed in the non-adhesive opacified layer.

Another variation is using Orgasol 1002 D NAT (nylon 6 particles) in place of the Daiplacoat RHC 731. Still another useful variation was to use either Orgasol 1002 D NAT or the Daiplacoat in the meltable layer. The separation of the paper from the substrate was easier in the final transfer step due to weakening of the melted layer, and the tack of the transfer was reduced at elevated temperatures, so it is less likely to stick to other materials or to the drier if the garment is dried at elevated temperatures.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A method of forming an opaque image on a substrate, the method comprising:

printing toner ink on a toner printable sheet to form imaged areas and unimaged areas;

forming a first temporary laminate by combining the toner printable sheet and a coating transfer sheet, wherein the coating transfer sheet comprises a meltable coating layer;

separating the first temporary laminate to form a coated toner printed sheet and an intermediate imaged coated transfer sheet, wherein the meltable coating layer of the coated transfer sheet has transferred to the imaged areas defined by the toner ink on the toner printable sheet to form the coated toner printed sheet, wherein the meltable coating layer remaining on the intermediate image coated transfer sheet corresponds to the unimaged areas of the toner printable sheet;

forming a second temporary laminate by combining the intermediate imaged coated transfer sheet with an opaque transfer sheet, wherein the opaque transfer sheet comprises an opaque coating layer that overlies a reinforcement layer and a base sheet;

separating the second temporary laminate to form an intermediate melt-coated opaque transfer sheet, wherein the meltable coating layer remaining on the intermediate imaged coated transfer sheet has transferred to the opaque transfer sheet such that the meltable coating layer overlies the opaque coating layer; and transferring the opaque coating layer and the meltable coating layer of the intermediate melt-coated opaque transfer sheet to the substrate such that the opaque coating layer overlies the meltable coating layer and the meltable coating layer overlies the substrate, wherein the reinforcement layer splits upon transfer to the substrate and a portion of the reinforcement layer is transferred to the substrate with the opaque coating layer and the meltable coating layer of the intermediate melt-coated opaque transfer such that the reinforcement layer overlies the opaque coating layer, the opaque coating layer overlies the meltable coating layer, and the meltable coating layer overlies the substrate.

2. The method of claim 1, wherein the first temporary laminate is subjected to a first transfer temperature of less than about 150° C.

3. The method of claim 1, wherein the second temporary laminate is subjected to a second transfer temperature of greater than about 150° C.

4. The method of claim 1, wherein transferring the opaque coating layer and the meltable coating layer of the intermediate imaged coated transfer sheet to the substrate comprises subjecting the intermediate imaged coated transfer sheet to a temperature of greater than about 150° C.

5. The method of claim 1, wherein the opaque coating layer comprises a cross-linked polymeric material and an opacifier.

6. The method of claim 5, wherein the polymeric material of the opaque coating layer forms a three-dimensional crosslinked network.

7. The method of claim 5, wherein the opaque coating layer does not melt when subjected to temperatures of up to about 250° C.

8. The method of claim 1, wherein the opaque coating layer comprises polymer particles having an average size of from about 1 micron to about 50 microns.

9. The method of claim 8, wherein the polymer particles comprise a crosslinked polymer.

10. The method of claim 1, wherein the meltable coating layer comprises a powdered thermoplastic polymer and a film-forming binder.

11. The method of claim 1, wherein the reinforcement layer comprises a powdered thermoplastic polymer and a film-forming binder.

12. The method of claim 1, wherein the reinforcement layer comprises an opacifying material.

13. The method of claim 12, wherein the opacifying material is present in the reinforcement layer from about 15% to about 60% by weight of the reinforcement layer.

* * * * *